(12) United States Patent
Cheng

(10) Patent No.: US 10,575,656 B2
(45) Date of Patent: Mar. 3, 2020

(54) CARRYING DEVICE AND FOLDING METHOD THEREOF

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 0 days.

(21) Appl. No.: 16/164,127

(22) Filed: Oct. 18, 2018

(65) Prior Publication Data

US 2019/0116989 A1    Apr. 25, 2019

Related U.S. Application Data

(60) Provisional application No. 62/574,986, filed on Oct. 20, 2017.

(51) Int. Cl.
| | |
|---|---|
| A47D 1/02 | (2006.01) |
| F16H 19/04 | (2006.01) |
| A47C 4/00 | (2006.01) |
| A47C 4/34 | (2006.01) |
| A47C 4/20 | (2006.01) |
| A47C 4/10 | (2006.01) |
| A47C 4/44 | (2006.01) |

(52) U.S. Cl.
CPC ............ *A47D 1/023* (2017.05); *F16H 19/04* (2013.01); *A47C 4/00* (2013.01); *A47C 4/10* (2013.01); *A47C 4/20* (2013.01); *A47C 4/34* (2013.01); *A47C 4/44* (2013.01)

(58) Field of Classification Search
CPC ........... A47D 1/023; F16H 19/04; A47C 4/10; A47C 4/20; A47C 4/34; A47C 4/44; A47C 4/00
See application file for complete search history.

(56) References Cited

U.S. PATENT DOCUMENTS

| | | | |
|---|---|---|---|
| 7,878,583 B2 * | 2/2011 | Buckavich | A47D 1/023 297/46 |
| 7,896,431 B2 * | 3/2011 | Cui | A47D 1/10 297/16.1 |
| 7,988,228 B2 * | 8/2011 | Cui | A47D 1/10 297/16.1 |

(Continued)

*Primary Examiner* — Syed A Islam
(74) *Attorney, Agent, or Firm* — Muncy, Geissler, Olds & Lowe, P.C.

(57) ABSTRACT

A carrying device and a folding method thereof are disclosed. The carrying device includes a seat assembly, a front-leg assembly and a rear-leg assembly. The front-leg assembly includes an upper frame, a lower frame, a first transmission member and a second transmission member. The upper frame is disposed at the lower frame. The first transmission member is disposed at the upper frame and corresponded to the second transmission member. The rear-leg assembly disposed at the lower frame includes a third transmission member disposed corresponding to the second transmission member, a rear-leg frame, and a connector connecting the rear-leg frame with the lower frame. When the upper frame moves relative to the lower frame, the first transmission member drives the third transmission member to move by the second transmission member to link the connector to make the rear-leg frame approach or move away from the lower frame.

20 Claims, 18 Drawing Sheets

(56) References Cited

U.S. PATENT DOCUMENTS

| | | | | |
|---|---|---|---|---|
| 8,011,722 B2* | 9/2011 | Cui | .......................... | A47D 1/10 |
| | | | | 297/16.1 |
| 8,100,470 B1* | 1/2012 | Hu | .......................... | A47D 1/10 |
| | | | | 297/148 |
| 8,141,943 B2* | 3/2012 | Hu | .......................... | A47D 1/023 |
| | | | | 297/16.1 |
| 8,419,121 B2* | 4/2013 | Hu | .......................... | A47D 1/002 |
| | | | | 297/16.1 |
| 8,967,710 B2* | 3/2015 | Hu | .......................... | A47D 1/002 |
| | | | | 297/55 |
| 2008/0290699 A1* | 11/2008 | Golias | .................... | A47D 1/002 |
| | | | | 297/16.1 |
| 2016/0007766 A1* | 1/2016 | Sack | .................... | A47D 1/0081 |
| | | | | 297/16.1 |

* cited by examiner

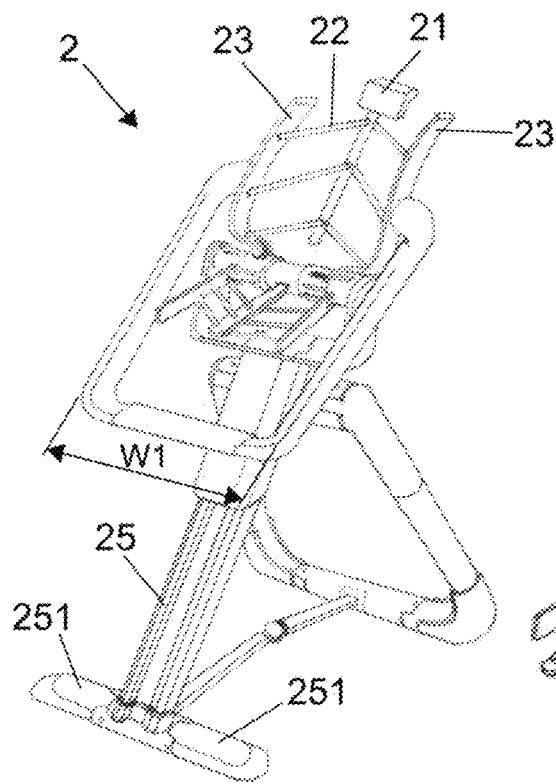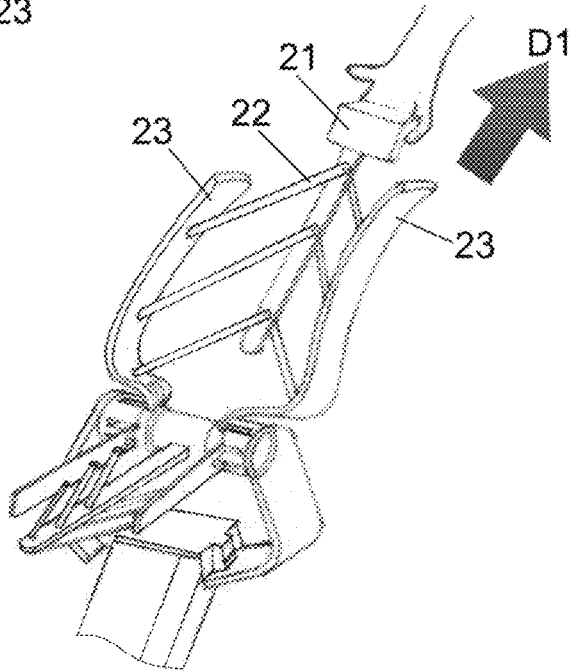
FIG.8A  FIG.8B
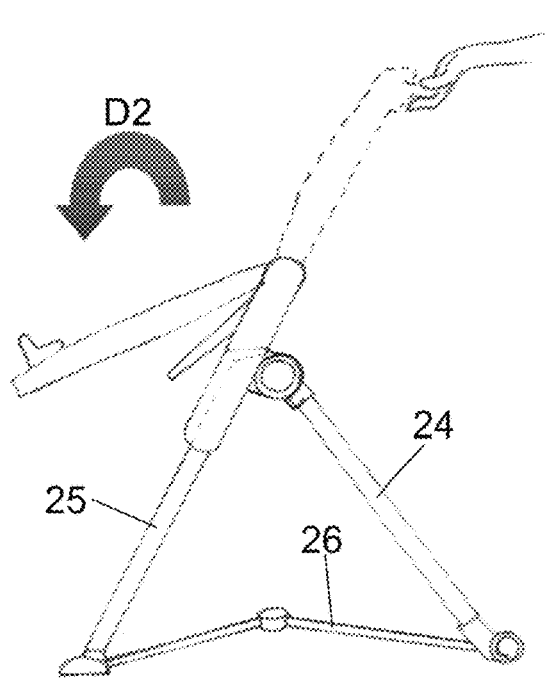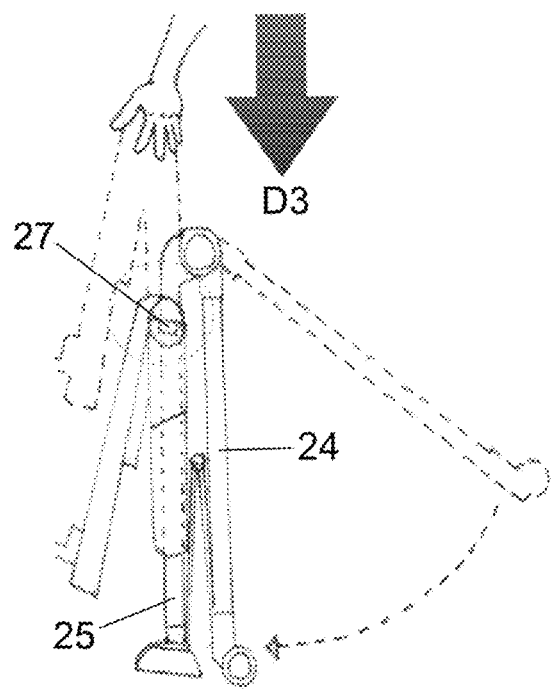
FIG.8C  FIG.8D

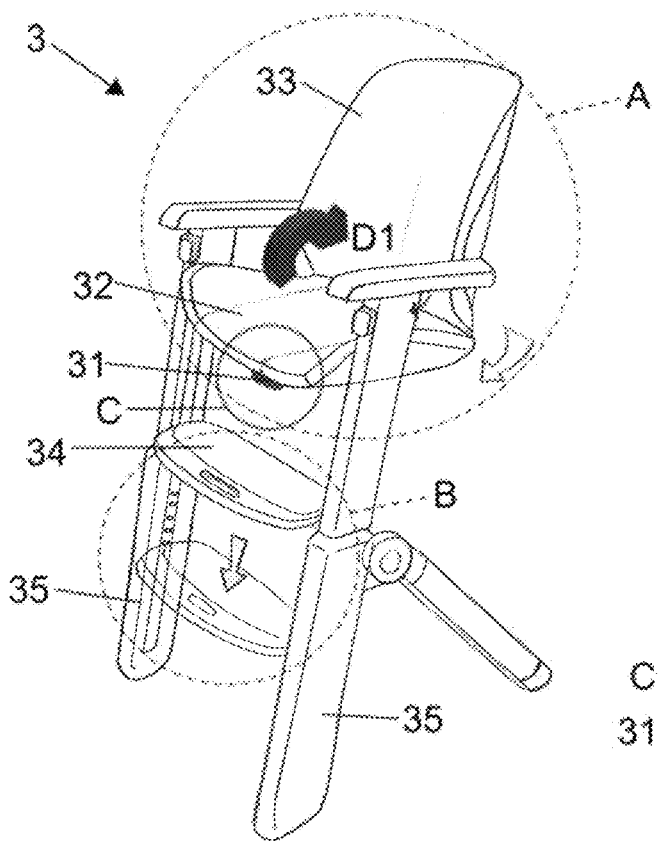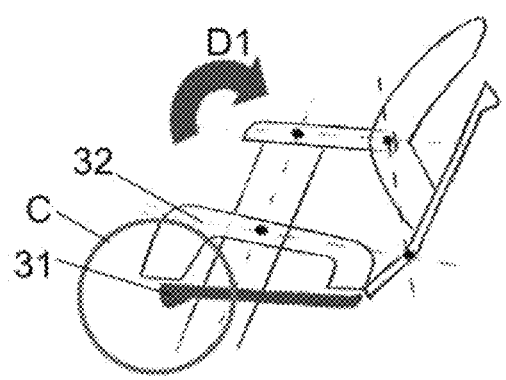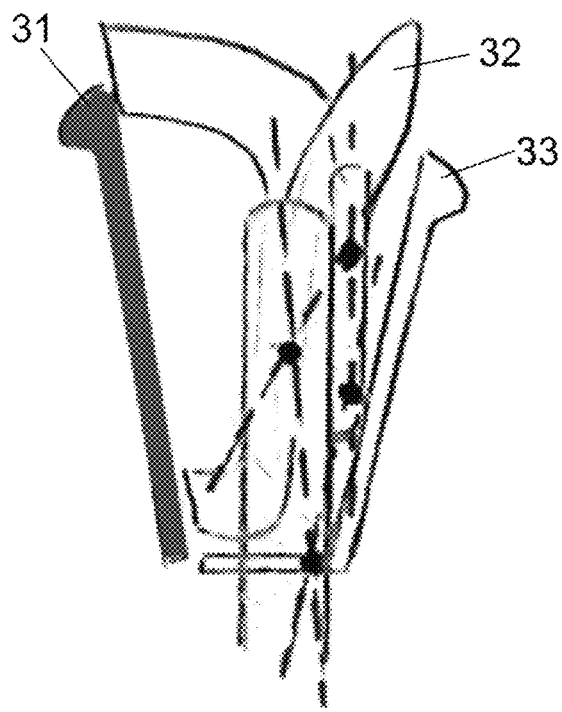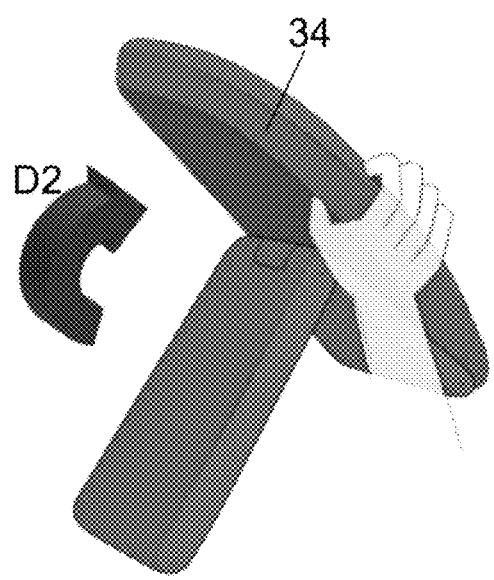
FIG.9A  FIG.9B
FIG.9C  FIG.9D

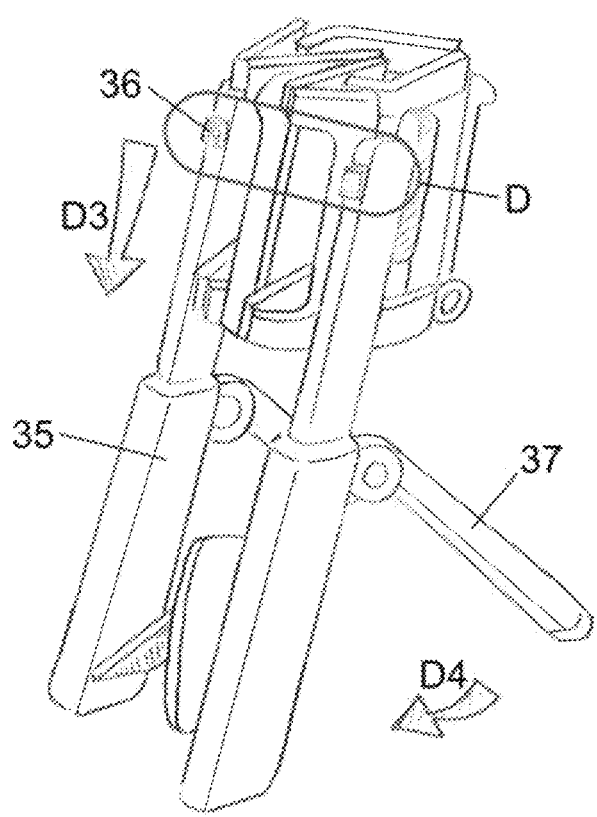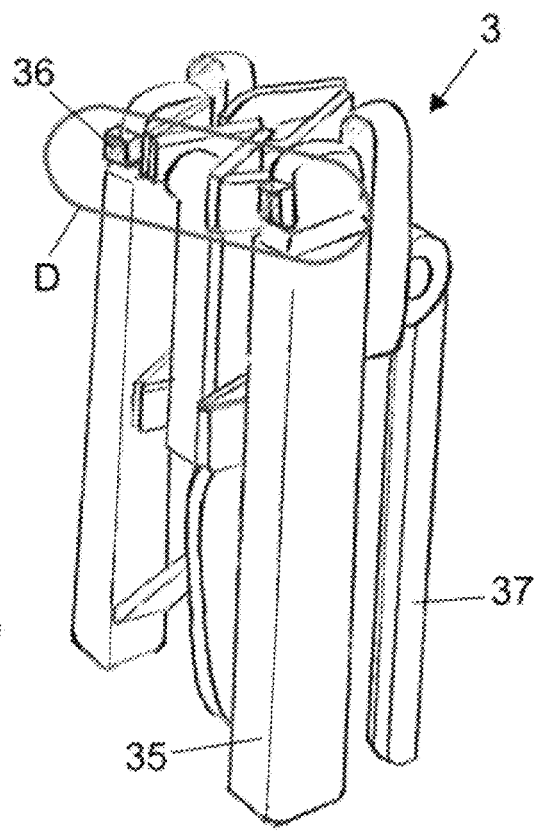
FIG.9E            FIG.9F
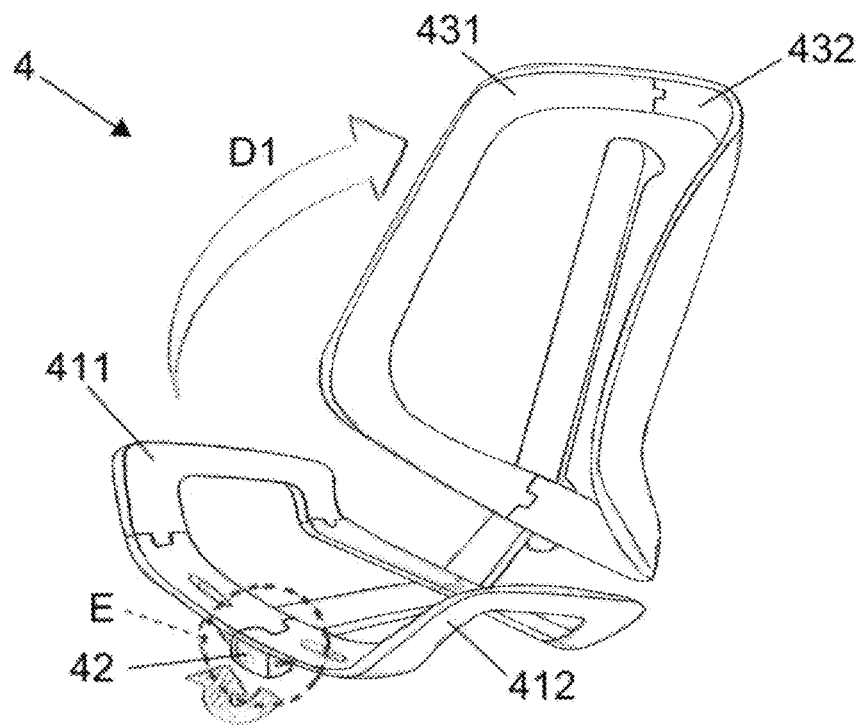
FIG.10A

CARRYING DEVICE AND FOLDING METHOD THEREOF

CROSS REFERENCE TO RELATED APPLICATIONS

This non-provisional application claims priority to U.S. provisional patent application Ser. No. 62/574,986 filed on Oct. 20, 2017. This and all other extrinsic materials discussed herein are hereby incorporated by reference in their entirety.

BACKGROUND OF THE INVENTION

Field of Invention

The disclosure relates to a carrying device, and more particularly to a carrying device having a quick retracting function and a folding method thereof.

Related Art

A carrying device includes, for example but without limitation to, a highchair for infants or children, wherein the highchair can be placed at a dining table during meals to make the children feel comfortable and safe, and can help the children to develop the diet and social skills. The highchair can be folded when not being used to facilitate the user in carrying, transporting or storing the highchair.

SUMMARY OF THE INVENTION

An objective of the disclosure is to provide a carrying device capable of being quickly retracted, and a folding method thereof. The carrying device of the disclosure has the advantage of quick retracting, and the retracted carrying device cannot occupy too large space to facilitate the user in carrying, transporting or storing the highchair.

To achieve the above-identified objective, a carrying device according to the disclosure includes a seat assembly, a front-leg assembly and a rear-leg assembly. The front-leg assembly includes an upper frame, a lower frame, a first transmission member and a second transmission member. The seat assembly is disposed at one side of the upper frame away from the lower frame. The upper frame is disposed at the lower frame. The second transmission member is disposed at the lower frame. The first transmission member is disposed at one side of the upper frame facing the second transmission member, and corresponded to the second transmission member. The rear-leg assembly is disposed at the lower frame and includes a third transmission member, a rear-leg frame and a connector. The third transmission member is disposed at one side of the lower frame facing the second transmission member, and corresponded to the second transmission member. The connector is connected with the rear-leg frame and the lower frame. When the upper frame moves relative to the lower frame, the first transmission member drives the third transmission member to move by the second transmission member to link the connector to make the rear-leg frame approach or move away from the lower frame.

To achieve the above-identified objective, a folding method of a carrying device according to the disclosure is provided. The carrying device includes a seat assembly, a front-leg assembly and a rear-leg assembly. The front-leg assembly includes an upper frame, a lower frame, a first transmission member and a second transmission member. The seat assembly is disposed at one side of the upper frame away from the lower frame. The rear-leg assembly is disposed at the lower frame and includes a third transmission member, a rear-leg frame and a connector. The connector is connected with the rear-leg frame and the lower frame. The folding method includes: moving a folding adjustment member which below the seat assembly to turn over the seat assembly to a pre-folding position; and moving the upper frame to a retracted position toward the lower frame, to make the first transmission member drive the third transmission member to move by the second transmission member to link the connector to make the rear-leg frame abut against the lower frame.

In one embodiment, the first transmission member and the third transmission member are respectively located at two sides of the second transmission member.

In one embodiment, the first transmission member and the third transmission member move in opposite directions.

In one embodiment, the third transmission member includes a pivot structure, and the third transmission member is connected with the rear-leg frame by the pivot structure.

In one embodiment, the lower frame further has a guide track, and the third transmission member is disposed corresponding to the guide track.

In one embodiment, the seat assembly includes a seat and a folding adjustment member disposed at the seat. When the folding adjustment member is moved relative to the seat, the seat assembly can be rotated to a pre-folding position relative to the front-leg assembly.

In one embodiment, at the pre-folding position, the upper frame can move toward the lower frame.

In one embodiment, the carrying device has a retracted state, and the retracted state has a retracted position. At the retracted position, the upper frame, the lower frame and the rear-leg frame are substantially parallel to one another.

In one embodiment, the carrying device further has an unfolded state, the unfolded state has an unfolded position, and widths of the seat assembly at the retracted position and that at the unfolded position are different from each other.

In one embodiment, the seat assembly includes a seat and a height adjustment member. The height adjustment member is disposed at the seat. The seat is connected with the upper frame. When the height adjustment member is moved relative to the seat, a position of the seat connected with the upper frame can be adjusted.

In one embodiment, the seat assembly includes a seat back and a back adjustment member. The back adjustment member is disposed at the seat back. When the back adjustment member is moved relative to the seat back, a tilt angle of the seat back can be adjusted.

In one embodiment, the second transmission member can be a gear.

As mentioned hereinabove, in the carrying device of the disclosure and the folding method thereof, the seat assembly is disposed at one side of the upper frame away from the lower frame, the upper frame is disposed at the lower frame, and the first transmission member is disposed at one side of the upper frame facing the second transmission member, and corresponded to the second transmission member. The rear-leg assembly is disposed at the lower frame, and the third transmission member thereof is disposed at one side of the lower frame facing the second transmission member, and corresponded to the second transmission member. The connector is connected with the rear-leg frame and the lower frame. With the above-mentioned structural design, when the upper frame moves relative to the lower frame, the first transmission member can drive the third transmission member to move by the second transmission member to link the connector to make the rear-leg frame approach or move away from the lower frame. Accordingly, the folding-retracting and unfolding processes of the carrying device of the disclosure become quite simple and quick. In addition to the objective of achieving the quick retracting, the folded volume is also quite small and does not occupy too much space to facilitate the user in carrying, transporting or storing the highchair.

BRIEF DESCRIPTION OF THE DRAWINGS

FIGS. 8A to 8G, 9A to 9F, 10A to 10E, and 11A to 11F are schematic views respectively showing folding processes of the carrying device in different embodiments of the disclosure.

DETAILED DESCRIPTION OF THE INVENTION

The embodiments of the carrying device and the folding method thereof of the disclosure will be apparent from the following detailed description, which proceeds with reference to the accompanying drawings, wherein the same references relate to the same elements.

Figure 1A:
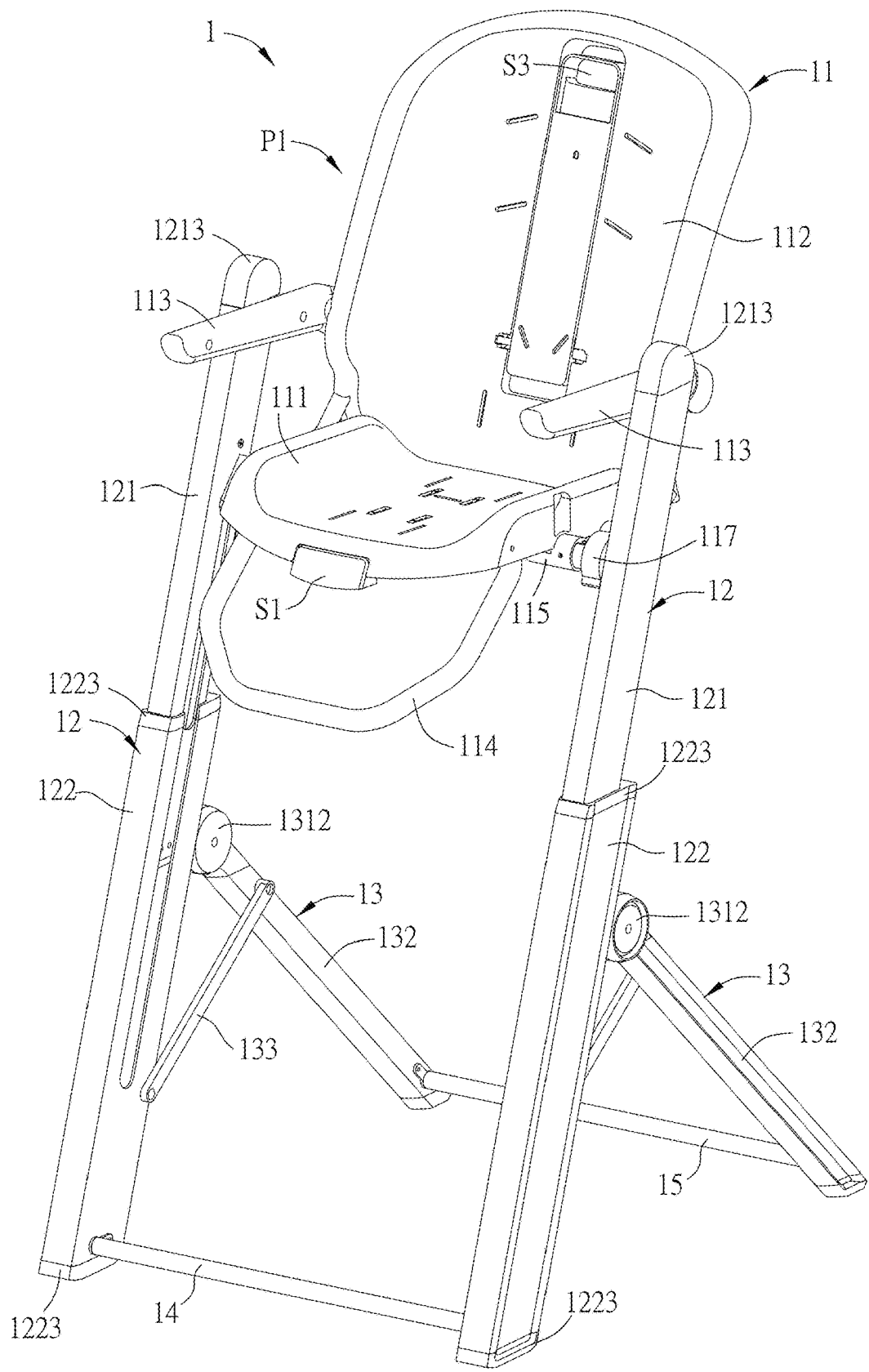
FIG. 1A is a pictorial view showing a carrying device according to an embodiment of the disclosure.
Figure 1B:
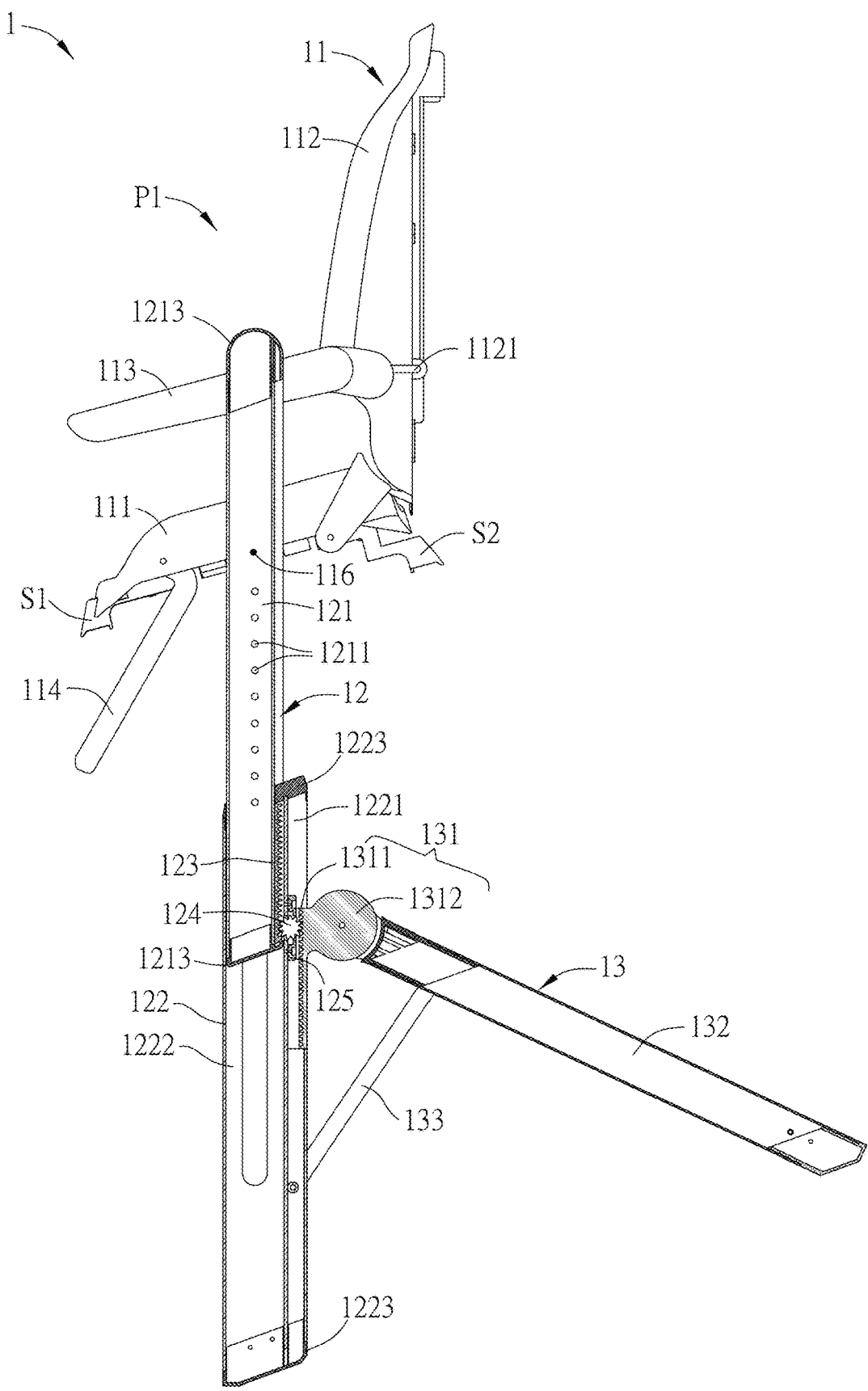
FIG. 1B is a schematically cross-sectional view showing the carrying device of FIG. 1A.
Figure 1C:
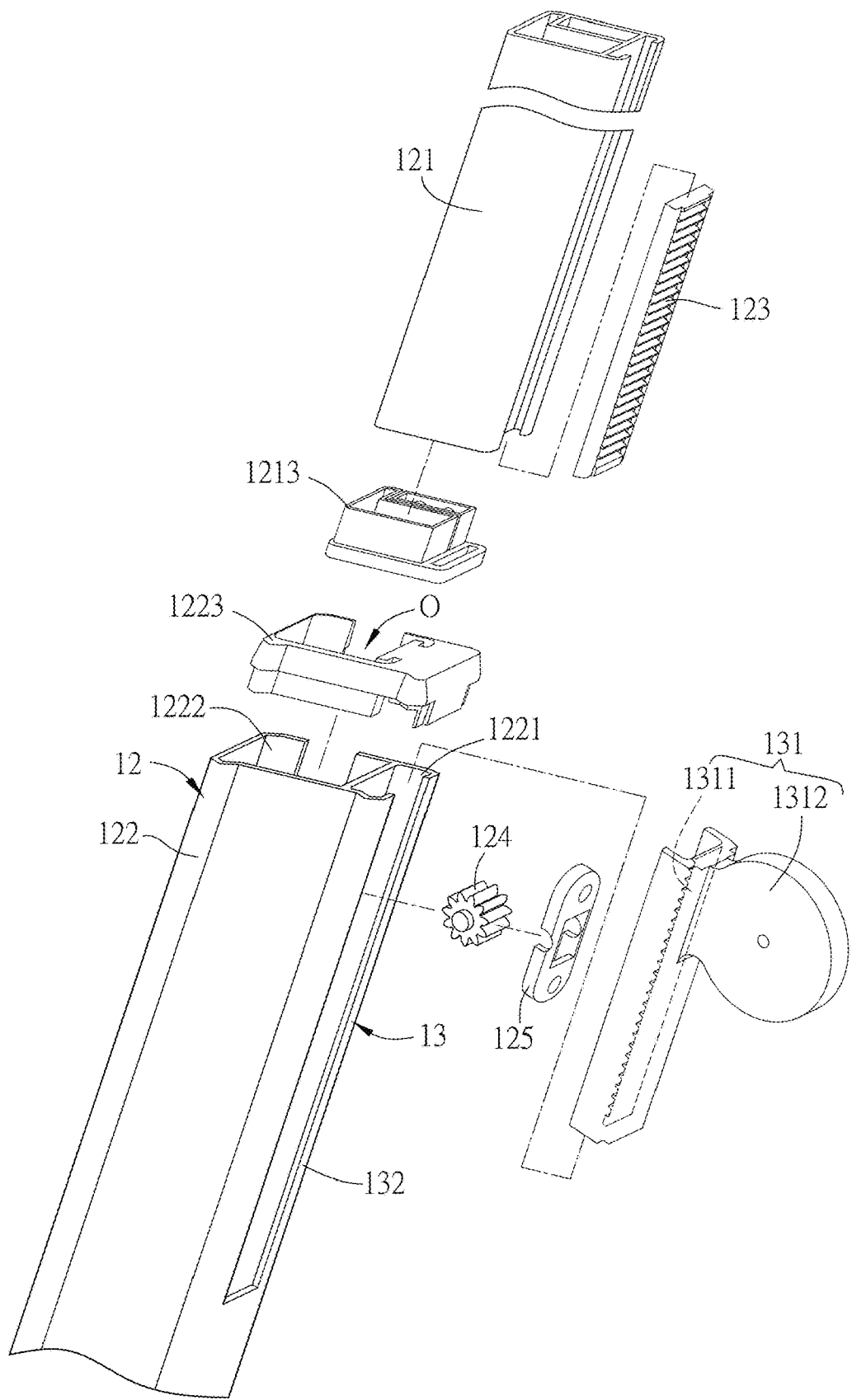
FIG. 1C is a partially decomposed schematic view showing the carrying device 1 of FIG. 1A.
Figure 1D:
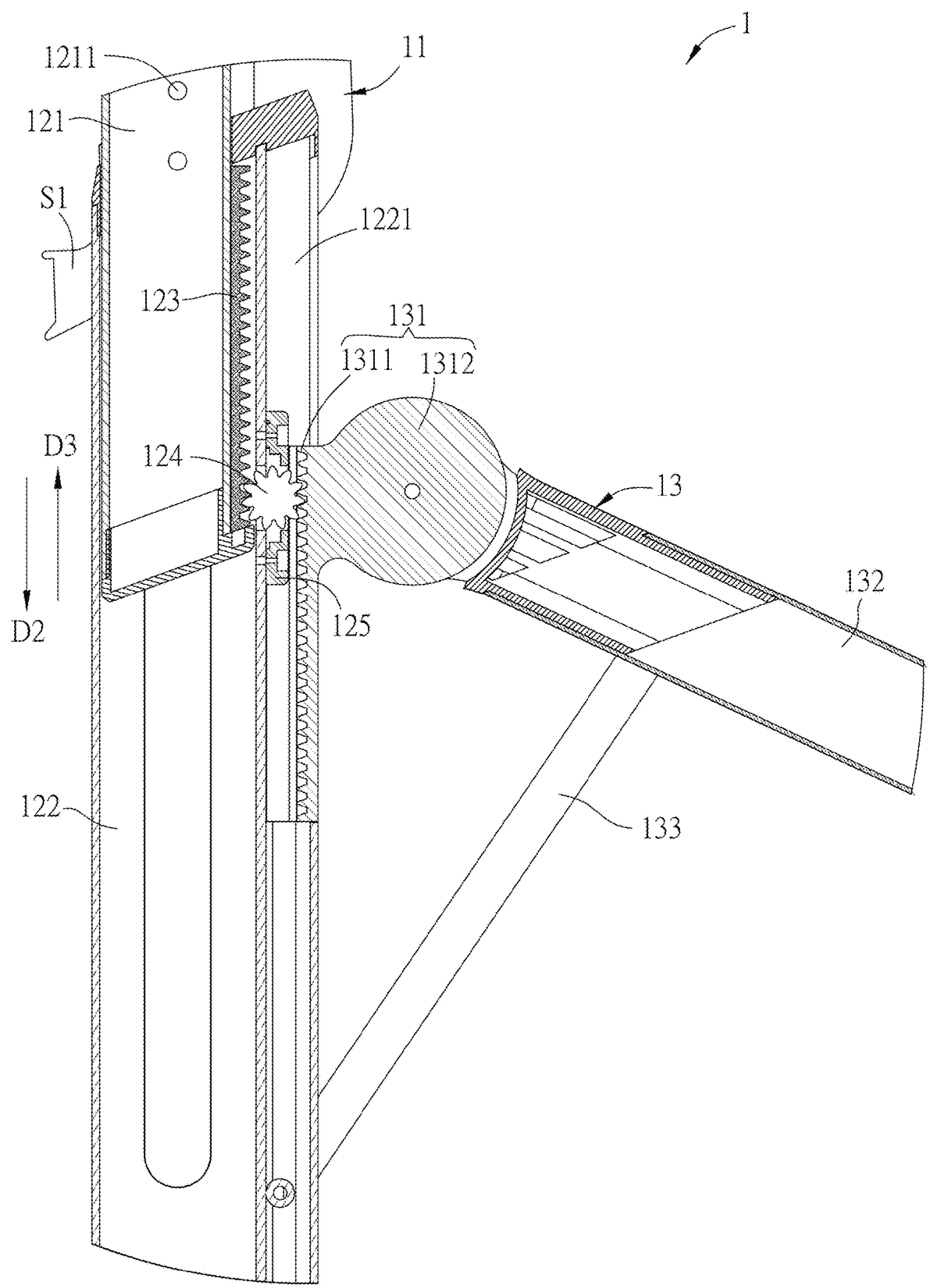
FIGS. 1D and 1E are partially schematic cross-sectional views showing the carrying device of FIG. 1A.
Figure 1E:
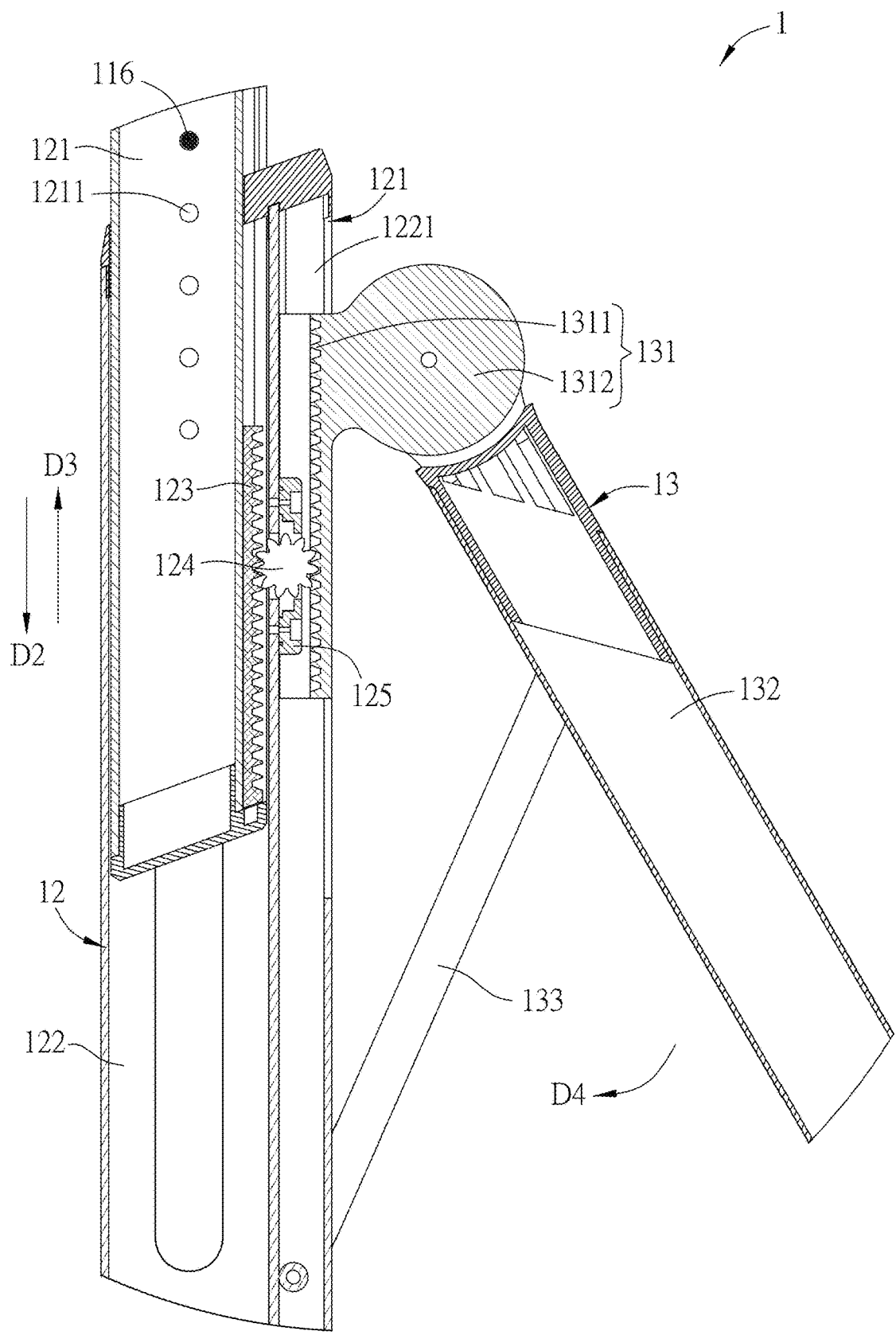

FIG. 1A is a pictorial view showing a carrying device 1 according to an embodiment of the disclosure. FIG. 1B is a schematically cross-sectional view showing the carrying device 1 of FIG. 1A. FIG. 1C is a partially decomposed schematic view showing the carrying device 1 of FIG. 1A. FIGS. 1D and 1E are partially schematic cross-sectional views showing the carrying device 1 of FIG. 1A. The carrying device 1 of this embodiment includes, for example but without limitation to, a highchair for a user (including for example but without limitation to an infant, a child or another appropriate rider) to sit. The "connection" used in the following embodiment may be "movable or rotatable connection", or "non-movable or non-rotatable connection" without further restriction. The detailed structure of the carrying device 1 is firstly explained, and then the folding processes thereof will be explained.

Referring to FIGS. 1A to 1C, the carrying device 1 may include a seat assembly 11, a front-leg assembly 12 and a rear-leg assembly 13. The carrying device 1 of this embodiment includes two front-leg assemblies 12 and two rear-leg assemblies 13. The two front-leg assemblies 12 have the same structure, are substantially disposed in parallel and are connected together by a connection link 14, so that no relative movement is present between both of them. The two rear-leg assemblies 13 also have the same structure, are substantially disposed in parallel and are mutually connected together by another connection link 15, so that no relative movement is present between both of them (i.e., fixed connection is present) and that the riding stability and safety are increased.

The front-leg assembly 12 includes an upper frame 121, a lower frame 122, a first transmission member 123 and a second transmission member 124. The seat assembly 11 is disposed at one side of the upper frame 121 away from the lower frame 122. The seat assembly 11 of this embodiment includes a seat 111, a seat back 112, two armrests 113 and a foot rest 114. The seat 111 is connected with the seat back 112, and is connected with the upper frame 121. The two armrests 113 are disposed at two sides of the seat back 112, wherein each armrest 113 is connected with the upper frame 121, and is connected with one side of the seat back 112. The foot rest 114 is disposed at the front side of the lower side of the seat 111, and has two ends respectively connected with two ends of the lower side of the seat 111. In some embodiments, the foot rest 114 may be selectively omitted. In addition, in some embodiments, it is also possible to selectively add a tray (not shown), which is connected to the two armrests 113 and for placement of articles.

The seat assembly 11 of this embodiment may further include a folding adjustment member S1, a height adjustment member S2 and a back adjustment member S3. The folding adjustment member S1 is disposed at the seat 111. When the folding adjustment member S1 is moved (including for example but without limitation to "being pulled") relative to the seat 111, the seat assembly 11 can be folded (or retracted) into the folded (or retracted) state, wherein further explanations will be made in the following.

The height adjustment member S2 is disposed at the seat 111 (FIG. 1B). When the height adjustment member S2 is moved (e.g., pulled) relative to the seat 111, a position of the seat 111 connected with the upper frame 121 can be adjusted, that is, the height of the seat 111 from the ground is changed. As shown in FIG. 1B, the height adjustment member S2 can be connected with an insert member (e.g., pin) 116 using a connection assembly including, for example but without limitation to, a connector or a connection wire. When the user wants to change the height of the seat 111 from the ground, the user can pull the height adjustment member S2 to make the insert member 116 be separated from an original hole 1211 on the upper frame 121, and the user can move the seat 111 and insert the insert member 116 into another hole 1211 to fix the height of the seat 111. In addition, the back adjustment member S3 disposed at one side of the seat back 112 facing the seat 111 (FIG. 1A). When the back adjustment member S3 is moved (e.g., pulled) relative to the seat back 112, the tilt angle of the seat back 112 can be adjusted. Herein, pulling the back adjustment member S3 can link an adjustment rod 1121 (FIG. 1B) to change the position of the adjustment rod 1121 inserted in the slot of the armrest 113, and the tilt angle of the seat back 112 can be adjusted.

The upper frame 121 corresponds to and matches with the lower frame 122, and the upper frame 121 is movably disposed at and connected with the lower frame 122. In this embodiment, as shown in FIGS. 1B and 1C, the upper frame 121 is an inner tube, and the lower frame 122 is an outer tube. The inner tube (upper frame 121) is disposed inside the outer tube (lower frame 122) and can be moved relative to each other by using a guide track 1222 which is mutually cooperating to each other so that the front-leg assembly 12 can be folded. In a different embodiment, the upper frame 121 may also be an outer tube, and the lower frame 122 may also be an inner tube. This disclosure is not particularly restricted thereto.

The second transmission member 124 is disposed at one side of the lower frame 122 near the upper frame 121, the first transmission member 123 is disposed at one side of the upper frame 121 facing the lower frame 122, and the first transmission member 123 corresponds to and matches with the second transmission member 124. Herein, the second transmission member 124 is disposed on the lower frame 122 by a fixing member 125, and the second transmission member 124 is rotatable in the fixing member 125. In addition, the upper frame 121 and the lower frame 122 may respectively have two end members 1213 and 1223, wherein the two end members 1213 and 1223 are disposed in correspondence with two ends of the upper frame 121 and the lower frame 122, so that the carrying device 1 being used cannot injure people due to the too-sharp end portions of the upper frame 121 and the lower frame 122. In some embodiments, the end members 1213 and 1223 may be cover members. It is worth mentioning that, as shown in FIG. 1C, a middle of the end member 1223 facing the upper frame 121 is formed with a through hole O, so that the upper frame 121 can penetrate through the through hole O and be movably disposed in the lower frame 122.

The rear-leg assembly 13 is movably disposed at the lower frame 122. Herein, the rear-leg assembly 13 can be moved relative to the lower frame 122, and this relative movement makes the rear-leg assembly 13 approach or move away from lower frame 122. As shown in FIGS. 1B to 1D, the rear-leg assembly 13 may include a third transmission member 131, a rear-leg frame 132 and a connector 133. The third transmission member 131 is disposed at one side of the lower frame 122 facing the second transmission member 124, and corresponded to the second transmission member 124, and the two ends of the connector 133 are respectively connected with the lower frame 122 of the rear-leg frame 132. In addition, the third transmission member 131 of this embodiment further includes a pivot structure 1312, the third transmission member 131 is connected with the rear-leg frame 132 by the pivot structure 1312.

The first transmission member 123 and the third transmission member 131 are respectively located at two sides of the second transmission member 124, and the first transmission member 123 and the third transmission member 131 are respectively corresponded to the second transmission member 124. The first transmission member 123 of the embodiment is a rack, the second transmission member 124 is a rotatable member and may be a gear, and one side of the third transmission member 131 facing the first transmission member 123 includes another rack 1311. In different embodiments, the first transmission member 123, the second transmission member 124 and the third transmission member 131 may also have different implementation aspects. In addition, in order to make the rear-leg assembly 13 be moved relative to the lower frame 122, one side of the lower frame 122 of this embodiment facing the third transmission member 131 further has a guide track 1221, and the third transmission member 131 is disposed corresponding to the guide track 1221, so that the third transmission member 131 can move along the guide track 1221.

Thus, as shown in FIGS. 1D and 1E, when the first transmission member 123 is moved in a direction D2 or D3 to drive the second transmission member 124 to rotate, the third transmission member 131 generates the movement opposite to the moving direction of the second transmission member 124 due to the rotation of the second transmission member 124, so that the third transmission member 131 can be moved in the direction D3 or D2 in the guide track 1221. Alternatively, when the third transmission member 131 is moved in the direction D2 or D3 in the guide track 1221, the second transmission member 124 can be driven to rotate, so that the first transmission member 123 generates the movement opposite to the moving direction of the third transmission member 131 due to the rotation of the second transmission member 124. That is, the first transmission member 123 and the third transmission member 131 move in opposite directions (D2 and D3; or D3 and D2).

Thus, when the upper frame 121 is moved relative to the lower frame 122 (e.g., when the upper frame 121 is moved in the direction D2), the first transmission member 123 is also moved in the direction D2, and the first transmission member 123 drives the third transmission member 131 to move in the direction D3 by the rotation of the second transmission member 124 to link the connector 133 to make the rear-leg frame 132 automatically approach the lower frame 122 (FIG. 1E, direction D4), and the objective of the quick retracting the rear-leg frame 132 can be achieved. In addition, when the upper frame 121 is moved relative to the lower frame 122 (e.g., when the upper frame 121 is moved in the direction D3), the first transmission member 123 drives the third transmission member 131 to move in the direction D2 by the rotation of the second transmission member 124 to link the connector 133 to make the rear-leg frame 132 automatically move away from lower frame 122, so that the rear-leg frame 132 is unfolded.

Figure 3:
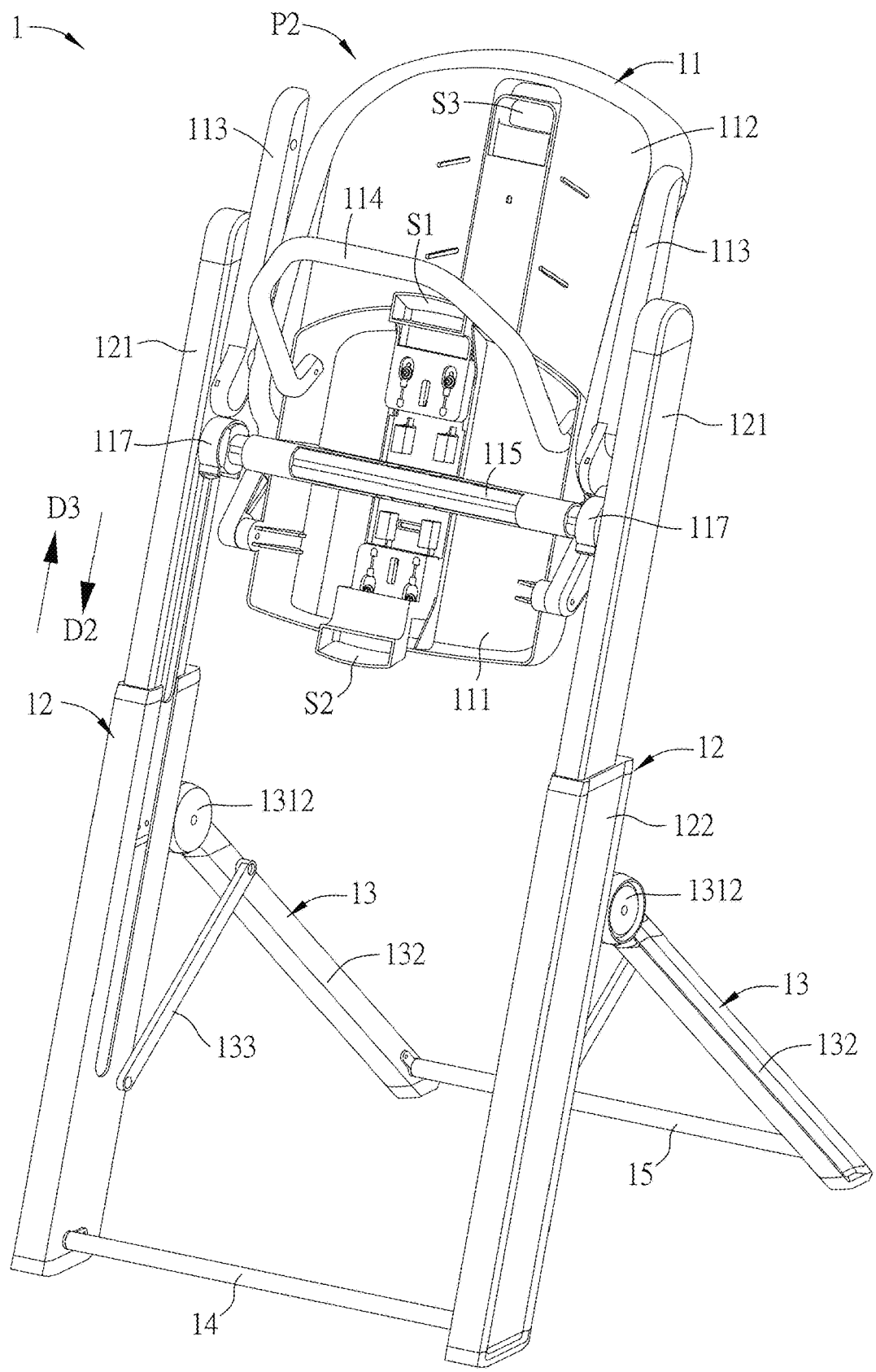
Figure 4:
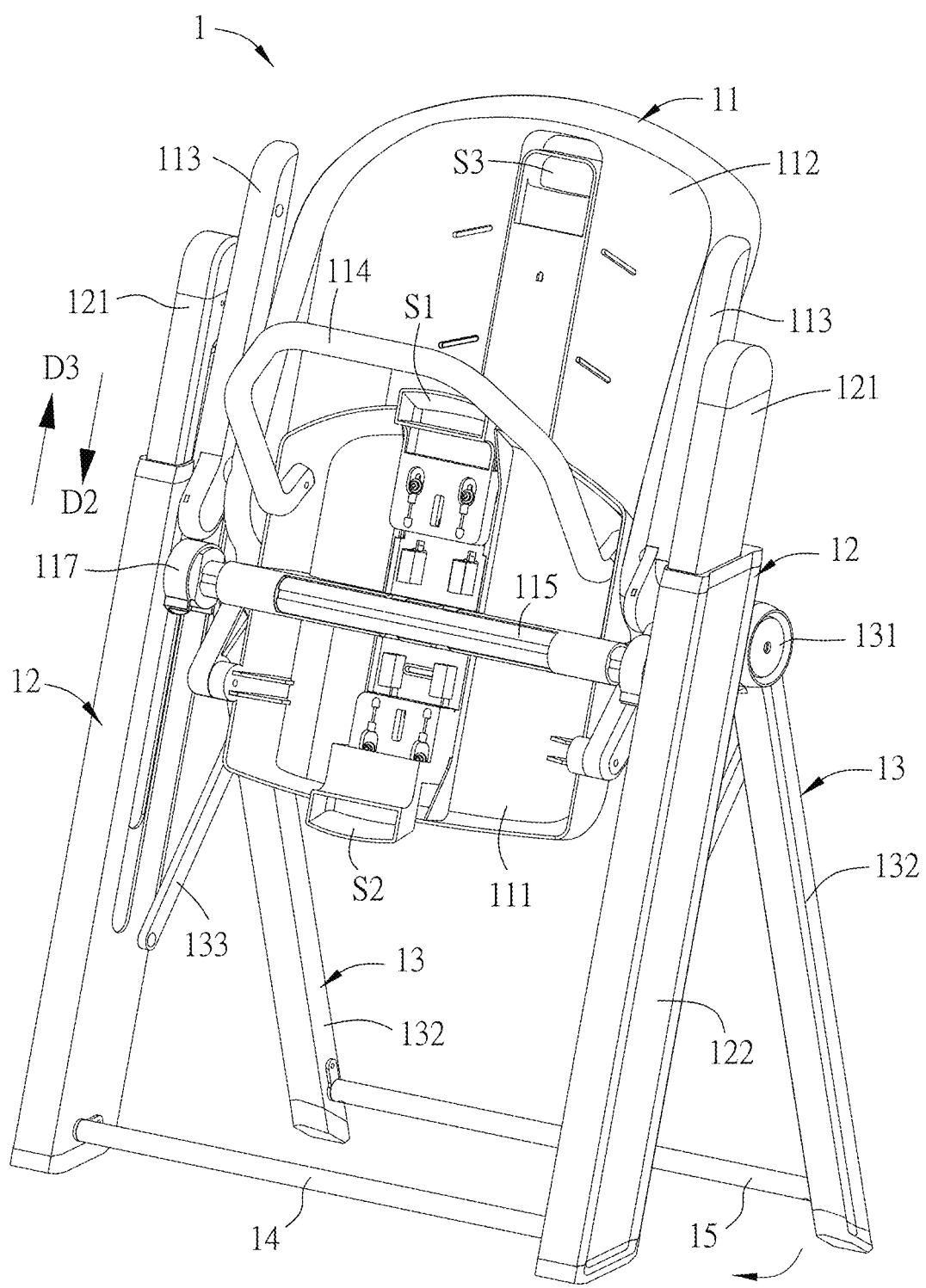
Figure 5:
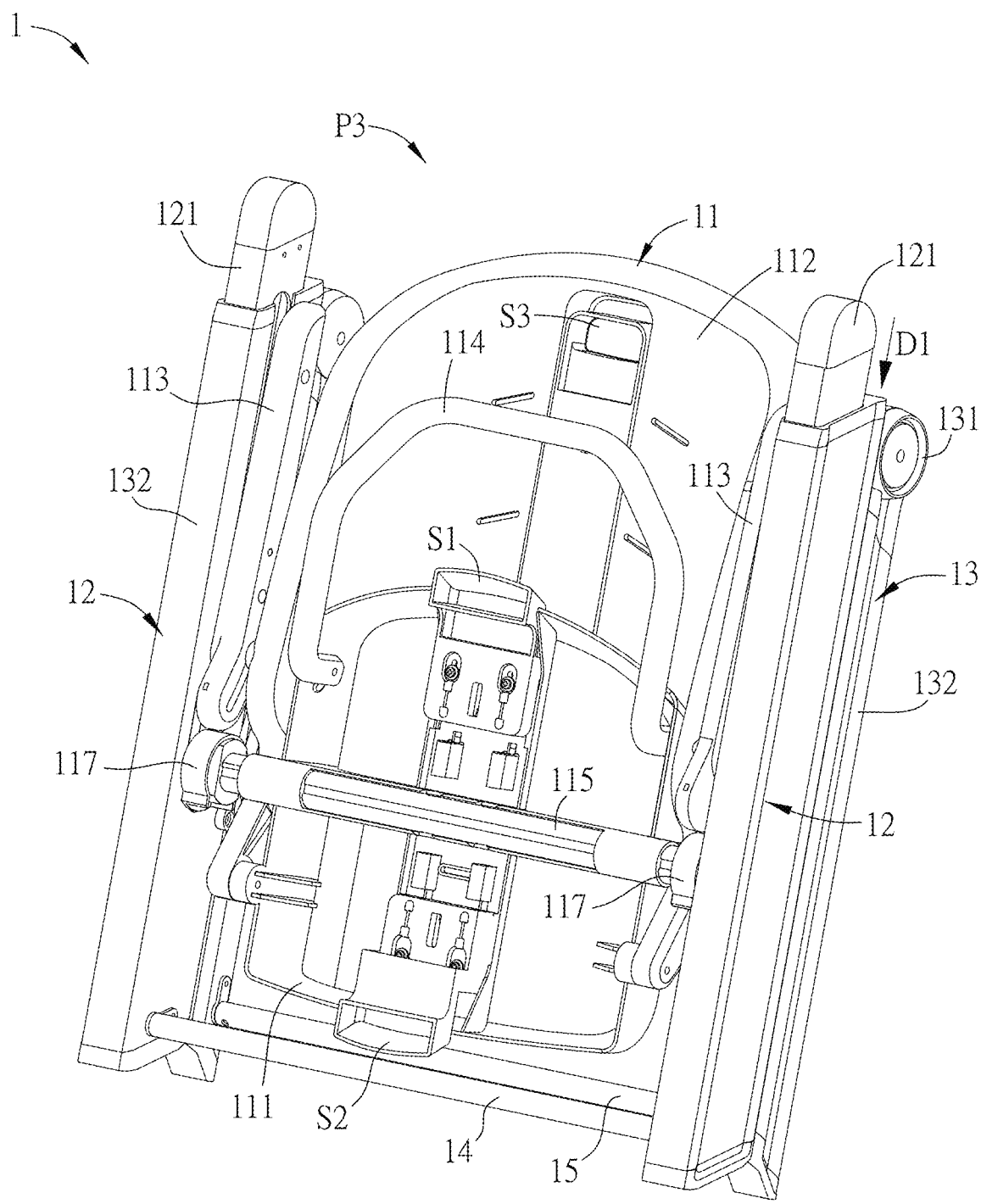
Figure 6:
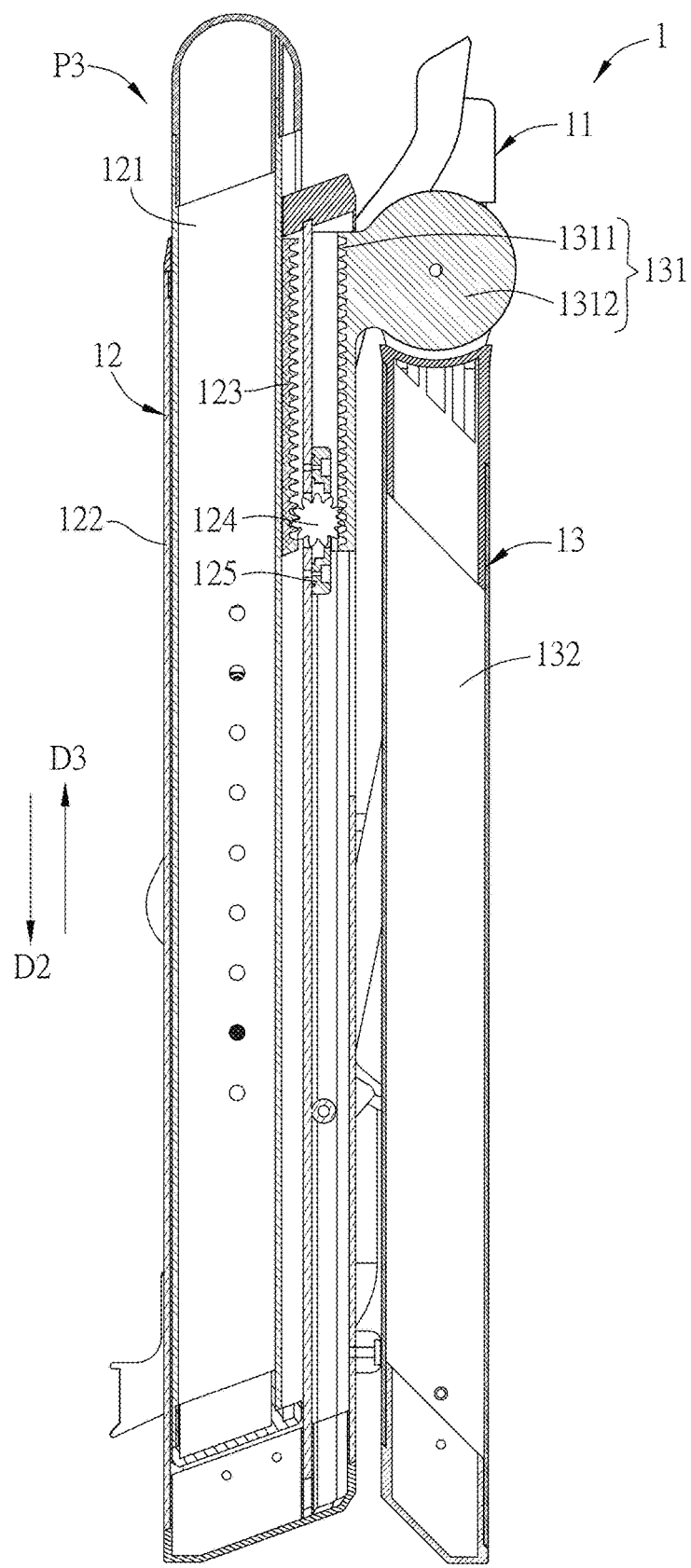
Figure 7:
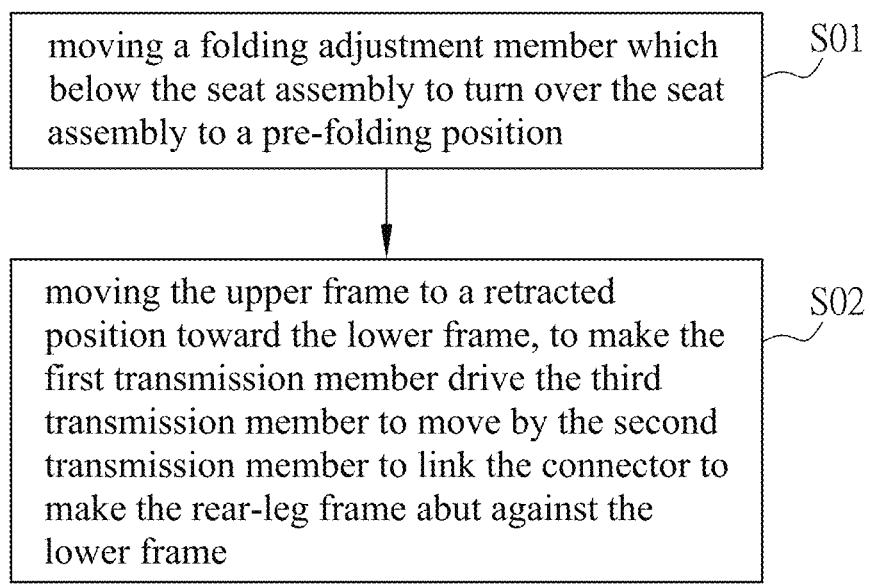
FIG. 7 is a flow chart showing steps of the folding method of the carrying device of FIG. 1A.

In the following, the folding processes of the carrying device 1 of this embodiment will be explained with reference to FIGS. 1A, and 2 to 6 in conjunction with FIG. 7. FIGS. 2 to 6 are schematic views showing the folding processes of the carrying device 1 of FIG. 1A, and FIG. 7 is a flow chart showing steps of the folding method of the carrying device 1 of FIG. 1A. The carrying device 1 has an unfolded state and a retracted state, the unfolded state has an unfolded position (or referred to as a used position) P1 (FIGS. 1A and 2), the retracted state has a retracted position (folded position) P3 (FIGS. 5 and 6).

Figure 2:
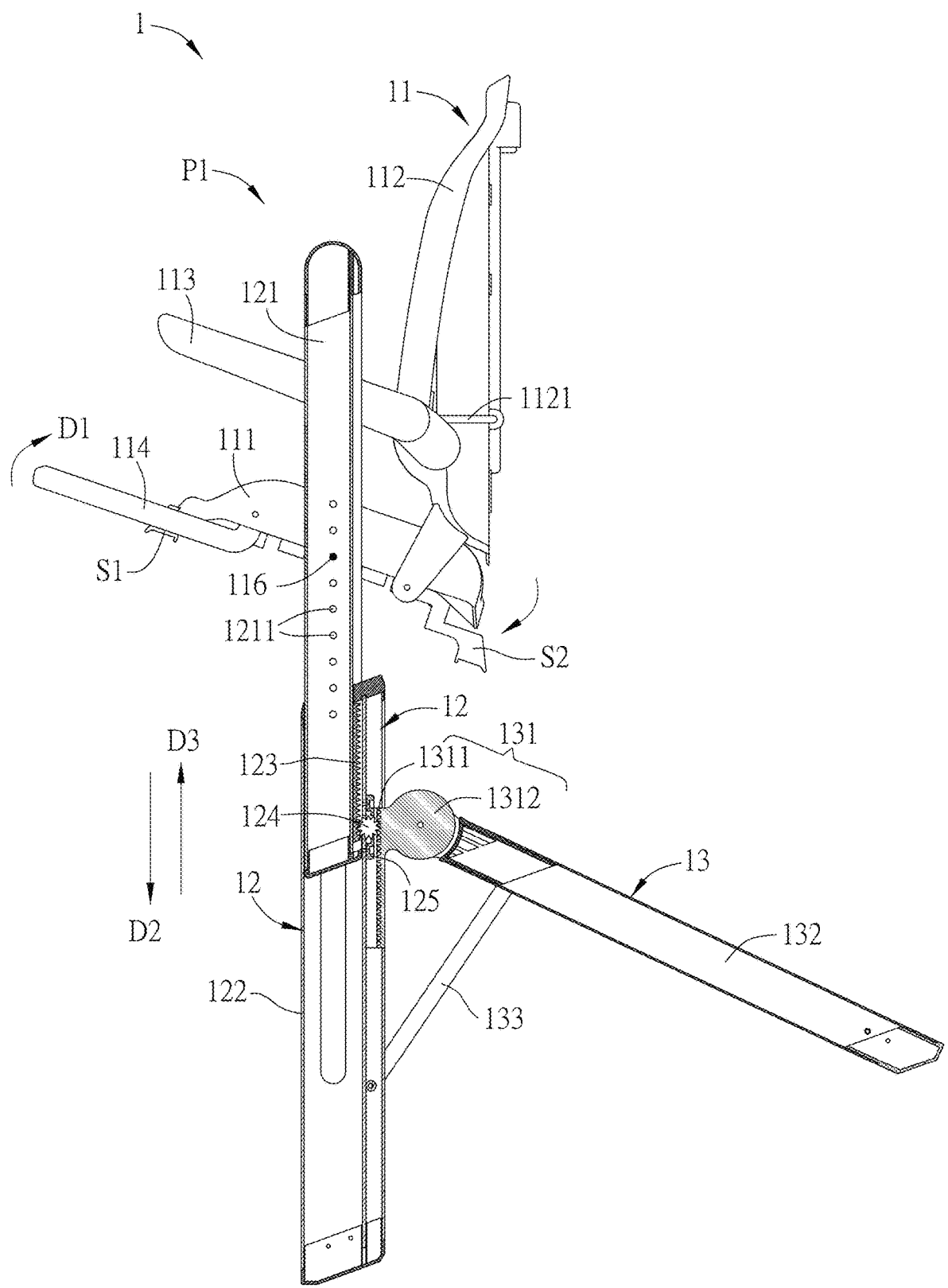
FIGS. 2 to 6 are schematic views showing the folding processes of the carrying device of FIG. 1A.

Referring to FIG. 7, the folding method of the carrying device 1 includes steps S01 and S02. Herein, as shown in FIGS. 1A, 2 and 3, the folding adjustment member S1 which below the seat assembly 11 is moved first, and the seat assembly 11 is turned to a pre-folding position P2 in a direction D1 (step S01). Herein, the seat 111 is disposed on a connector 115, and two rotating mechanisms 117 are connected with two ends of the connector 115. The seat assembly 11 is inserted into the corresponding hole 1211 of the upper frame 121 to fix its height by the insert member 116 (FIGS. 2 and 3) disposed in the rotating mechanism 117. So, in order to make the seat assembly 11 be turned to the pre-folding position P2 (FIG. 3) to fold the front-leg assembly 12, the user needs to turn over the seat assembly 1 in the direction D1 while moving the folding adjustment member S1 at the unfolded position P1. At this time, moving the folding adjustment member S1 may be implemented by pulling the insert member 116 away from the hole 1211 of the upper frame 121, and the turning operation in the direction D1 may further be implemented through the mechanism designs of engagement blocks and stopper members in the rotating mechanism 117, so that the seat assembly 11 is turned to a predetermined angle (i.e., to reach the pre-folding position P2) in the direction D1 relative to the upper frame 121, and the upper frame 121 is moved in the direction (i.e., the direction D2) toward the lower frame 122, so that the front-leg assembly 12 can be folded.

Next, the upper frame 121 is moved to a retracted position (folded position) P3 toward the lower frame 122, so that the first transmission member 123 drives the third transmission member 131 to move by the second transmission member 124 to link the connector 133 to make the rear-leg frame 132 abut against the lower frame 122 (step S02). As shown in FIGS. 4 to 6 and as mentioned hereinabove, when the upper frame 121 is moved in the direction D2, the first transmission member 123 drives the third transmission member 131 to move in the direction D3 by the rotation of the second transmission member 124 to link the connector 133. Moving the third transmission member 131 in the direction D3 and connecting the connector 133 with the lower frame 122 of the rear-leg frame 132 can make the rear-leg frame 132 automatically approach the lower frame 122 until the retracted state is entered, so that the objective of quickly and automatically retracting the rear-leg frame 132 can be achieved. In the processes of automatically retracting and folding the rear-leg frame 132, the rear-leg frame 132 can be automatically retracted and folded to approach the lower frame 122 further by the design of the upper stopper member 126 disposed at the upper frame 121. In addition, as shown in FIGS. 5 and 6, the upper frame 121, the lower frame 122 and the rear-leg frame 132 are substantially parallel to one another at the retracted position (folded position) P3.

When the user wants to use the carrying device 1, the unfolding operation is reverse to the retracting operation. The upper frame 121 is firstly moved to the pre-folding position P2 (FIG. 3) in the direction (direction D3) away from the lower frame 122, while the first transmission member 123 drives the third transmission member 131 to move in the direction D2 by the rotation of the second transmission member 124 to link the connector 133 to make the rear-leg frame 132 automatically move away from the lower frame 122 to unfold the rear-leg frame 132 to the predetermined position. Then, the seat assembly 11 is turned to the unfolded position P1 (FIG. 1A) in the direction opposite to the direction D1. In the process of unfolding the rear-leg frame 132, the design of the end member 1213 (also referred to as the lower stopper member) makes the rear-leg frame 132 be automatically unfolded and move away from the lower frame 122. Thus, the folding-retracting and unfolding processes of the carrying device 1 of this embodiment are quite simple and quick, and the folded volume is also quite small and does not occupy too much space to facilitate the user in carrying, transporting or storing the highchair. It is worth mentioning that the turning over (retracting) of the foot rest 114 does not affect the above-mentioned folding step. The user can turn over the foot rest 114 in the direction D1 before the step S01, after the step S02, in the step S01 or in the step S02 to retract the foot rest 114 (FIG. 2).

In addition, other technical characteristics of the folding method of the carrying device 1 can be found hereinabove, and detailed descriptions thereof will be omitted herein.

FIGS. 8A to 8G, 9A to 9F, 10A to 10E, and 11A to 11F are schematic views respectively showing folding processes of the carrying device in different embodiments of the disclosure.

Figure 8E:
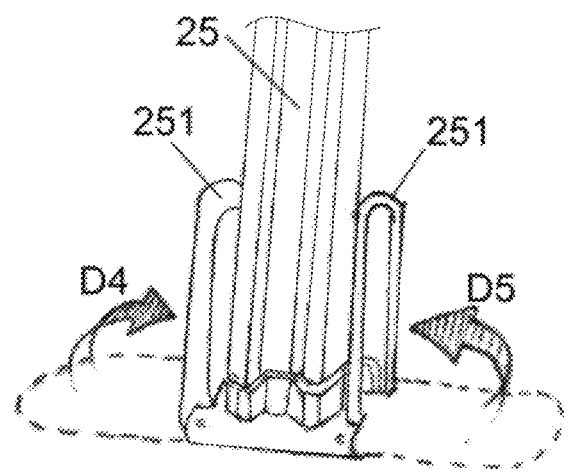
Figure 8F:
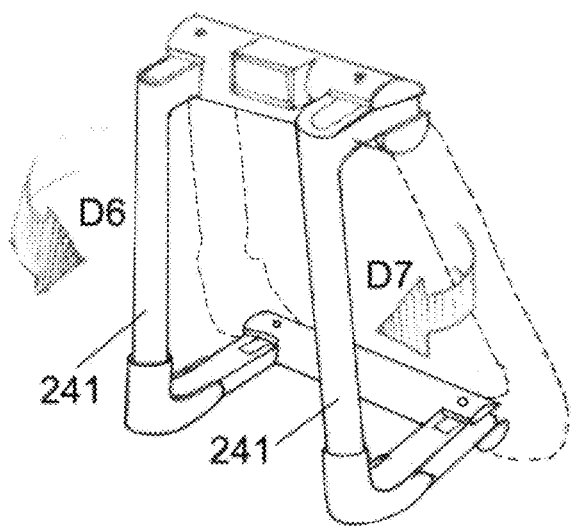
Figure 8G:
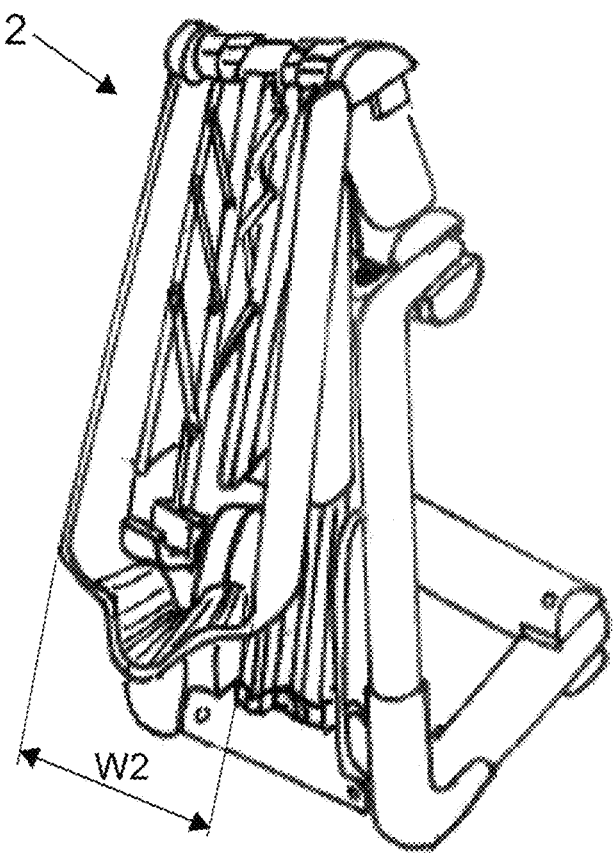

In folding processes of a carrying device 2, as shown in FIGS. 8A and 8B, a handle 21 above the seat back is firstly pulled to move in the direction D1, and a width of a framework 23 of a seat connected with two sides of a connection link 22 is decreased because the handle 21 is pulled up and the mechanism of the connection link 22 works. Next, as shown in FIGS. 8C and 8D, the seat back is bent toward the seat. Then, buttons 27 at two sides of the seat are pressed. Meanwhile, the seat back and the seat are pressed down (in the direction D3) to adjust the height of a front leg 25, and a rear leg 24 is moved toward the front leg 25 (in the retracted state). At this time, a connector 26 between the front leg 25 and the rear leg 24 is automatically bent (FIG. 8C) due to the mechanism linking. Then, as shown in FIG. 8E, while the height of the front leg 25 is adjusted, support portions 251 at two sides of the front leg 25 are automatically folded in directions D4 and D5 (upward) and approach the front leg 25 due to mechanism linking. Next, as shown in FIG. 8F, two side portions 241 of two sides of the rear leg 24 are bent in directions (D6 and D7) toward the front leg 25 so that they approach each other to decrease the overall width and obtain the carrying device 2 in the folded state, as shown in FIG. 8G. In this folded (retracted) state, the width of the carrying device 2 (including the seat assembly) is changed (decreased), so that the width W2 of the carrying device 2 (including the seat assembly) at the folded (retracted) position (FIG. 8G) is different from the width W1 at the unfolded position (FIG. 8A), where W1>W2.

FIGS. 9B and 9C are side views showing a region A of FIG. 9A. FIG. 9D is a partial schematic view showing a region B of FIG. 9A. In folding processes of a carrying device 3, as shown in FIGS. 9A to 9C, a handle 31 (see region C of FIG. 9B) which below a seat 32 is pulled, and the seat 32 is turned over in the direction D1 and approaches a seat back 33. Then, as shown in FIGS. 9A and 9D, a pedal 34 between two front legs 35 is pressed down, and is turned in the direction D2 (right side) to decrease the width between the two front legs 35. Thereafter, as shown in FIG. 9E, buttons 36 in a region D and above the two side front legs 35 are concurrently pressed down to press upper frames of the front legs 35 in the direction D3 (the direction toward the lower frames) to adjust (decrease) the overall height of the front leg 35. Thereafter, rear legs 37 are retracted in the direction D4 so that the rear legs 37 approach the front legs, and the carrying device 3 in the folded state is obtained, as shown in FIG. 9F. In this folded (retracted) state, the width of the carrying device 3 (including the seat assembly) is changed (decreased), so that the carrying device 3 (including seat assembly) has different widths at the folded (retracted) position (FIG. 9F) and that at the unfolded position (FIG. 9A).

Figure 10B:
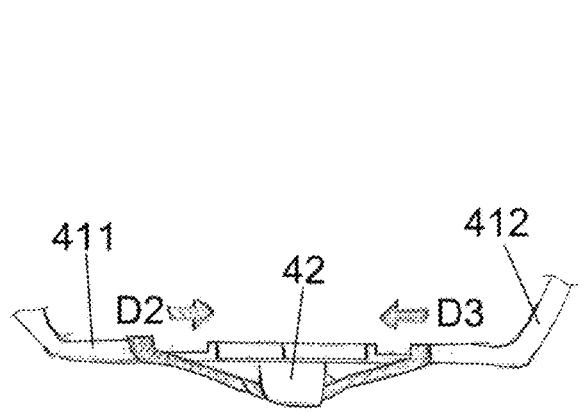
Figure 10C:
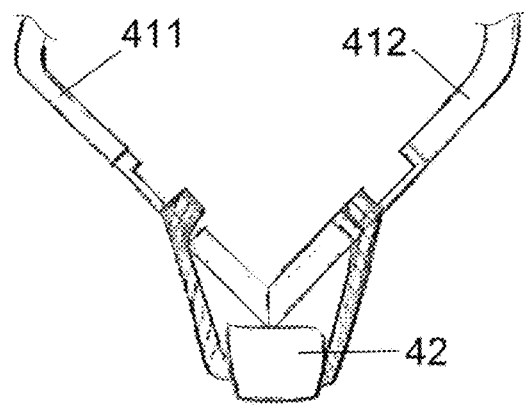
Figure 10D:
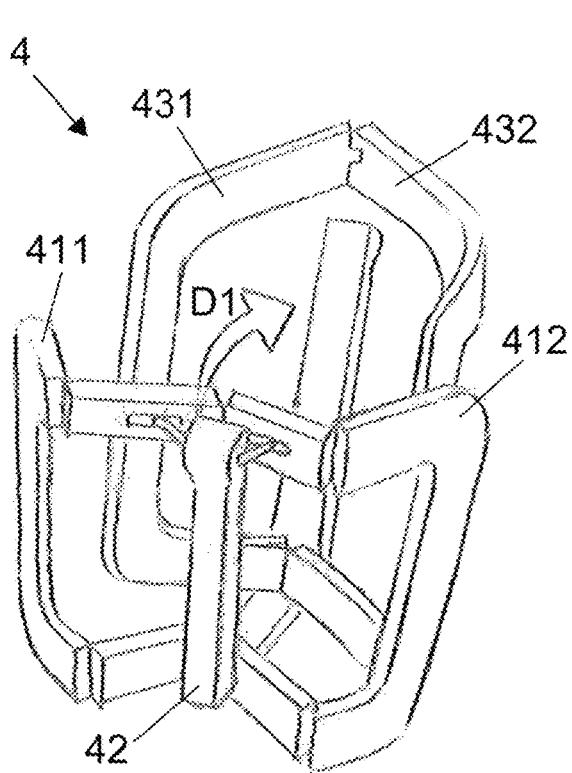
Figure 10E:
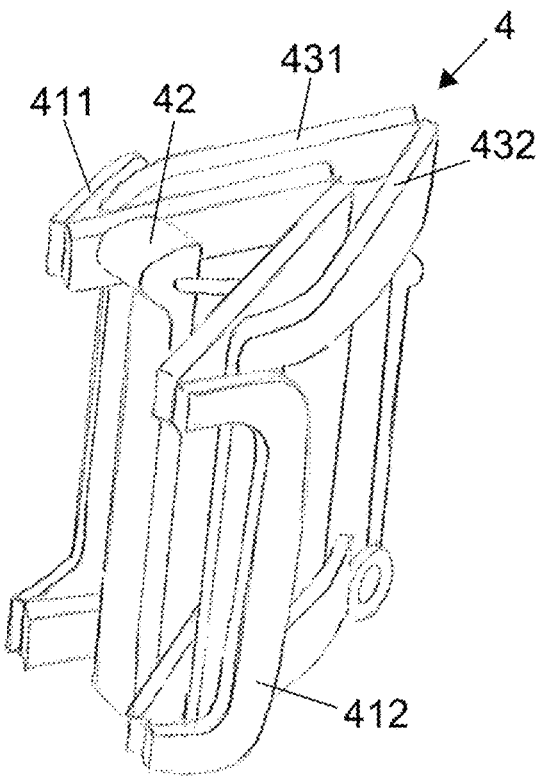

In folding processes of a carrying device 4, as shown in FIGS. 10A to 10D, a handle 42 (region E) which below the seat is firstly pulled. Meanwhile, the seat is folded in the direction (D1) toward the seat back. At this time, two side portions 411 and 412 of the seat are folded toward the middle due to the mechanism linking (see moving directions D2 and D3 in FIGS. 10B and 10C) of the handle 42. Meanwhile, the seat is moved in the direction D1 of FIG. 10D to approach the seat back. Then, as shown in FIG. 10E, two side portions 431 and 432 of the seat back are turned over to respectively bend the side portions 431 and 432, so that the side portions 431 and 432 are located between the two side portions 411 and 412 and partially overlap with each other, the overall width of the carrying device 4 is decreased, and the carrying device 4 in the folded state is obtained, as shown in FIG. 10E. In this folded (retracted) state, the overall width of the carrying device 4 (seat assembly) is changed (decreased), so that the carrying device 4 (seat assembly) has different widths at the folded (retracted) position (FIG. 10E) and that at the unfolded position (FIG. 10A). It is worth mentioning that the carrying device 4 (seat assembly) of this embodiment may be applied to the seat assembly of the carrying device 3 of FIGS. 9A to 9F.

Figure 11A:
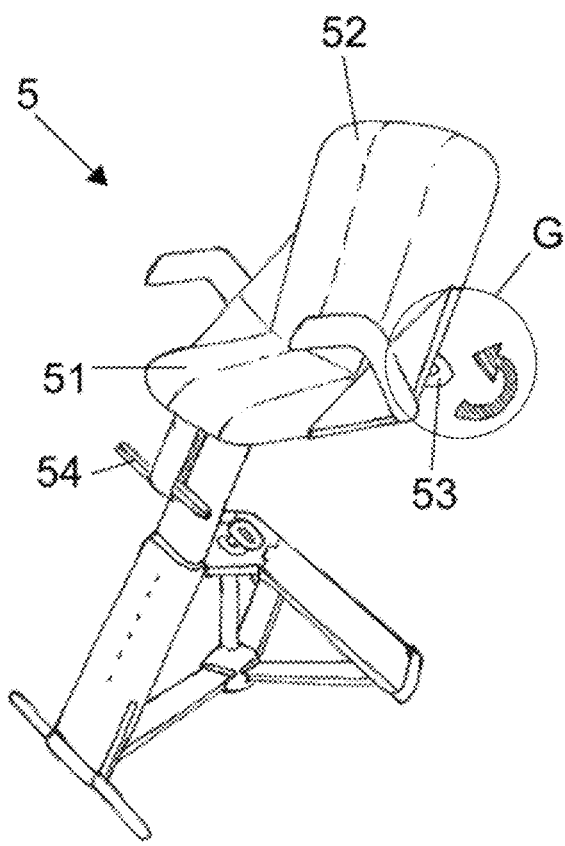
Figure 11B:
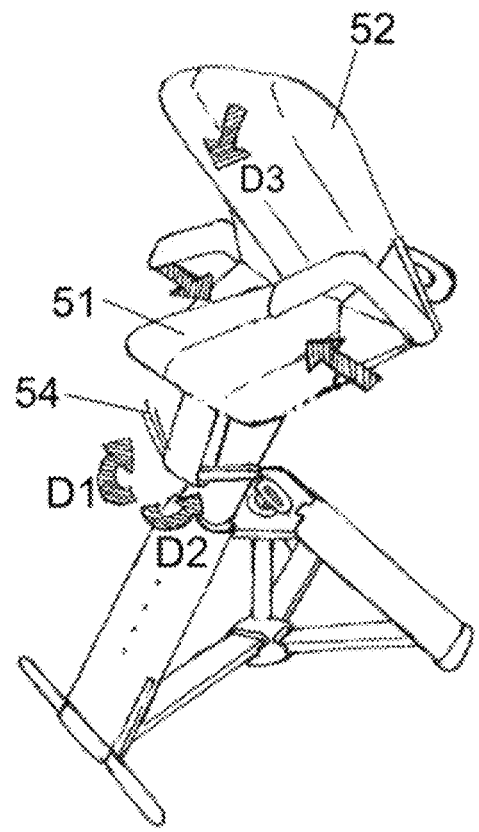
Figure 11C:
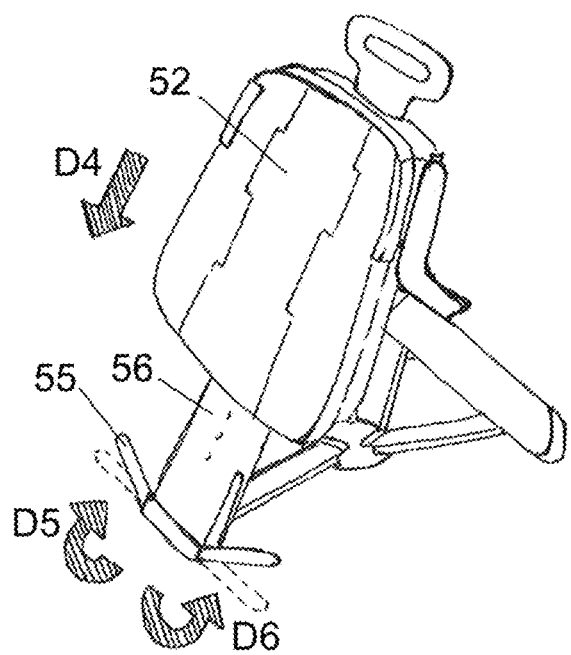
Figure 11D:
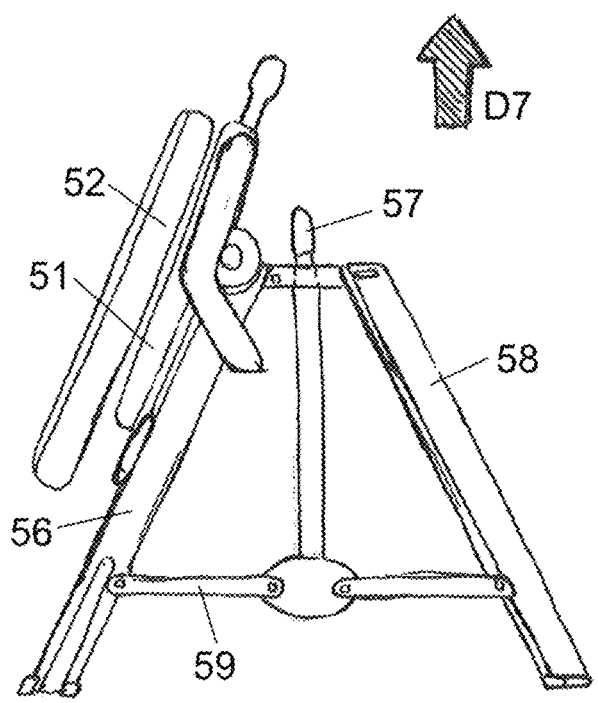
Figure 11E:
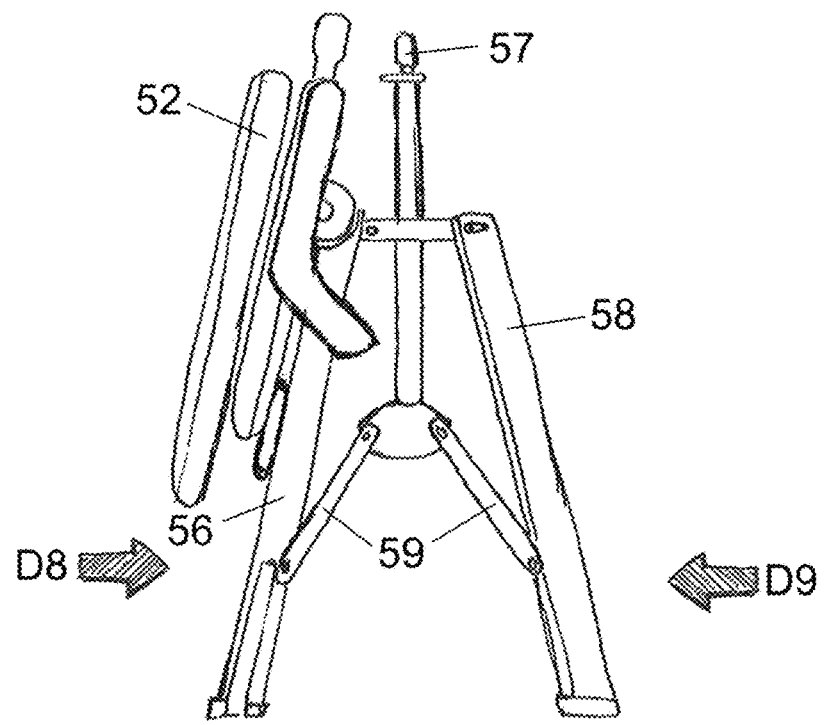
Figure 11F:
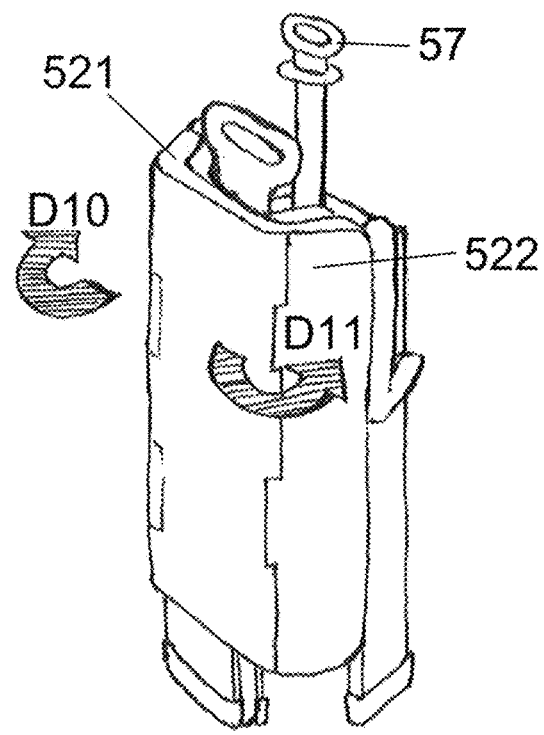

In folding processes of a carrying device 5, as shown in FIGS. 11A and 11B, upper pedals 54 at two sides are firstly folded in directions D1 and D2 (upward), and then a handle 53 (region G of FIG. 11A) at a lower side behind the seat back 52 is pulled. Meanwhile, the seat back 52 is folded, in the direction D3 toward a seat 51, to the position of FIG. 11C (the rear side of the seat back 52 faces frontward), the seat back 52 and the seat 51 are concurrently pressed in the direction D4 toward lower pedals 55 to decrease the height thereof (FIG. 11C), and the lower pedals 55 at two sides are retracted in the directions D5 and D6 (upward). Then, as shown in FIG. 11D, a handle 57 of a foot stand is lifted up (in the indicated direction D7). At this time, the front leg 56 and the rear leg 58 approach each other due to the handle 57 and its mechanism linking thereof (connector 59), as shown in the directions D8 and D9 indicated in FIG. 11E. Finally, side portions 521 and 522 of two sides of the seat back 52 are bent in the direction toward the handle 57, as indicated by the directions D10 and D11 of FIG. 11F, to decrease the overall width of the carrying device 5 and obtain the carrying device 5 in the folded state, as shown in FIG. 11F. In this folded (retracted) state, the width of the carrying device 5 (including the seat assembly) is changed (decreased), so that the carrying device 5 (including the seat assembly) has different widths at the folded (retracted) position (FIG. 11F) and that at the unfolded position (FIG. 11A).

As mentioned above, in the carrying device of the disclosure and the folding method thereof, the seat assembly is disposed at one side of the upper frame away from the lower frame, the upper frame is movably disposed at the lower frame, and the first transmission member is disposed at one side of the upper frame facing the second transmission member, and corresponded to the second transmission member. The rear-leg assembly is movably disposed at the lower frame, and the third transmission member thereof is disposed at one side of the lower frame facing the second transmission member, and corresponded to the second transmission member. The connector is connected with the rear-leg frame and the lower frame. With the above-mentioned structural design, when the upper frame moves relative to the lower frame, the first transmission member can drive the third transmission member to move by the second transmission member to link the connector to make the rear-leg frame approach or move away from the lower frame. Accordingly, the folding-retracting and unfolding processes of the carrying device of the disclosure become quite simple and quick. In addition to the objective of achieving the quick retracting, the folded volume is also quite small and does not occupy too much space to facilitate the user in carrying, transporting or storing the highchair.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A carrying device, comprising:
    a seat assembly;
    a front-leg assembly comprising an upper frame, a lower frame, a first transmission member and a second transmission member, the seat assembly is disposed at one side of the upper frame away from the lower frame, the upper frame is disposed at the lower frame, the second transmission member is disposed at the lower frame, the first transmission member is disposed at one side of the upper frame facing the second transmission member, and corresponded to the second transmission member; and
    a rear-leg assembly, the rear-leg assembly is disposed at the lower frame and comprises a third transmission member, a rear-leg frame and a connector, the third transmission member is disposed at one side of the lower frame facing the second transmission member, and corresponded to the second transmission member, the connector is connected with the rear-leg frame and the lower frame;
    wherein the first transmission member drives the third transmission member to move by the second transmission member to link the connector to make the rear-leg frame approach or move away from the lower frame when the upper frame moves relative to the lower frame.

2. The carrying device according to claim 1, wherein the first transmission member and the third transmission member are respectively located at two sides of the second transmission member.

3. The carrying device according to claim 2, wherein the first transmission member and the third transmission member move in opposite directions.

4. The carrying device according to claim 1, wherein the third transmission member comprises a pivot structure, and the third transmission member is connected with the rear-leg frame by the pivot structure.

5. The carrying device according to claim 4, wherein the lower frame further comprises a guide track, and the third transmission member is disposed corresponding to the guide track.

6. The carrying device according to claim 1, wherein the seat assembly comprises a seat and a folding adjustment member, the folding adjustment member is disposed at the seat, the seat assembly can be rotated to a pre-folding position relative to the front-leg assembly when the folding adjustment member is moved relative to the seat.

7. The carrying device according to claim 6, wherein at the pre-folding position, the upper frame can move toward the lower frame.

8. The carrying device according to claim 1, wherein the carrying device has a retracted state, the retracted state has a retracted position, at the retracted position, the upper frame, the lower frame and the rear-leg frame are substantially parallel to one another.

9. The carrying device according to claim 8, wherein the carrying device further has an unfolded state, the unfolded state has an unfolded position, and widths of the seat assembly at the retracted position and that at the unfolded position are different from each other.

10. The carrying device according to claim 1, wherein the seat assembly comprises a seat and a height adjustment member, the height adjustment member is disposed at the seat, the seat is connected with the upper frame, a position of the seat connected with the upper frame can be adjusted when the height adjustment member is moved relative to the seat.

11. The carrying device according to claim 1, wherein the seat assembly comprises a seat back and a back adjustment member, the back adjustment member is disposed at the seat back, a tilt angle of the seat back can be adjusted when the back adjustment member is moved relative to the seat back.

12. The carrying device according to claim 1, wherein the second transmission member can be a gear.

13. A folding method of a carrying device, the carrying device comprises a seat assembly, a front-leg assembly and a rear-leg assembly, the front-leg assembly comprises an upper frame, a lower frame, a first transmission member and a second transmission member, the seat assembly is disposed at one side of the upper frame away from the lower frame, the rear-leg assembly is disposed at the lower frame and comprises a third transmission member, a rear-leg frame and a connector, the connector is connected with the rear-leg frame and the lower frame, the folding method comprising steps of:

moving a folding adjustment member which below the seat assembly to turn over the seat assembly to a pre-folding position; and moving the upper frame to a retracted position toward the lower frame, to make the first transmission member drive the third transmission member to move by the second transmission member to link the connector to make the rear-leg frame abut against the lower frame.

14. The folding method according to claim 13, wherein the upper frame is disposed at the lower frame, the first transmission member is disposed at one side of the upper frame facing the second transmission member, the second transmission member is disposed at the lower frame and corresponded to the first transmission member.

15. The folding method according to claim 13, wherein the first transmission member and the third transmission member are respectively located at two sides of the second transmission member, and the first transmission member and the third transmission member are respectively corresponded to the second transmission member in the step of moving the upper frame toward the lower frame.

16. The folding method according to claim 15, wherein in the step of moving the upper frame toward the lower frame, the first transmission member and the third transmission member move in opposite directions.

17. The folding method according to claim 13, wherein the third transmission member comprises a pivot structure, and the third transmission member is connected with the rear-leg frame by the pivot structure.

18. The folding method according to claim 17, wherein the lower frame further has a guide track, the third transmission member is disposed corresponding to the guide track, and the third transmission member moves along the guide track in the step of moving the upper frame toward the lower frame.

19. The folding method according to claim 13, wherein the carrying device further has an unfolded state, the unfolded state has an unfolded position, and widths of the seat assembly at the retracted position and that at the unfolded position are different from each other.

20. The folding method according to claim 13, wherein the second transmission member can be a gear.

\* \* \* \* \*